United States Patent Office 3,419,356
Patented Dec. 31, 1968

3,419,356
PROCESS FOR CONTROLLING RUBBER HARDNESS PROPERTIES OF CARBON BLACK
Merrill E. Jordan, Walpole, and William G. Burbine, Whitman, Mass., assignors to Cabot Corporation, Boston, Mass., a corporation of Delaware
No Drawing. Filed Apr. 13, 1966, Ser. No. 542,197
8 Claims. (Cl. 23—209.4)

ABSTRACT OF THE DISCLOSURE

The present invention provides a method for controlling the rubber hardness properties of carbon blacks. Broadly, the method comprises the injection of phosphorous, in elemental or compound form, into a carbon forming reaction zone. Practice of the invention is of particular value when there is additionally charged into the reaction zone an alkali metal additive. Accordingly, in a preferred embodiment of the invention, there is utilized a combination of alkali metal and phosphorous in order to achieve a dual purpose: (1) a desirable depression in the modulus properties, and (2) maintenance of good rubber hardness properties of the product black.

---

U.S. Patents 3,010,794 and 3,010,795 to Friauf et al., issued Nov. 18, 1961 broadly disclose methods of controlling properties of carbon blacks produced by the thermal decomposition or incomplete combustion of fluid hydrocarbon feedstocks which comprises injecting an alkali metal into a carbon black producing reaction zone in minor amounts, i.e. above about 1 part per million by weight of the carbon black produced. The teachings of said patents have been found to be particularly valuable to the gas and oil furnace carbon black producing art because, prior to the advent of the aforementioned discovery, furnace carbon blacks generally tended to impart excessive elastic modulus to rubber stocks containing said blacks. In other words, rubber compositions containing furnace blacks tended to be brittle and lacked good elongation at yield properties. The use of alkali metal additives, particularly potassium, in the carbon forming zone of the furnace overcame these difficulties and rubber compositions containing blacks produced in accordance with the teachings of the aforementioned patents, exhibit lowered modulus and good elongation at yield properties. However, a disadvantage often found in utilizing such furnace blacks is that the rubber stocks containing same often tend to be excessively soft. In accordance with the present invention, however, this problem has been greatly alleviated.

It is a principal object of the present invention to provide a process for producing improved carbon blacks.

It is another object of the present invention to provide a process for producing carbon blacks which impart the combination of properties of low modulus, good elongation at yield and good hardness to rubber compositions containing same.

It is another object of the present invention to provide a process for controlling the rubber hardness properties of carbon black.

It is another object of the present invention to provide a process for controlling the rubber hardness properties of carbon black produced in the presence of a minor amount of alkali metal.

Other objects and advantages of the present invention will in part be obvious and will in part appear hereinafter.

In accordance with the present invention it was discovered that blacks produced by thermal decomposition or incomplete combustion of a fluid hydrocarbon and having desirable hardness properties in rubber compositions containing same are obtained when there is charged into a carbon forming reaction zone a minor amount of phosphorus.

Although the phosphorus can be provided to the carbon forming zone in the elemental form, it is generally much preferred, due to considerations of handling ease and stability, to utilize substances comprising phosphorus such as the organic or inorganic compounds of phosphorus. Specific examples of suitable compounds are: phosphoric acid, phosphorous acid, phosphorous pentachloride, phosphorous trichloride, phosphorous triodide, phosphorous oxychloride, phosphobenzene, phosphorobenzene, triethylphosphine, phosphine, dioctylphosphinic acid, trimethylphosphine oxide, phenyldichloridophosphine, and the like.

The specific method by which the phosphorus or phosphorus containing substance is introduced into the carbon forming zone is not particularly critical. For instance, the phosphorus can be introduced in a separate process stream, or can form part of any of the other streams normally utilized in the furnace process. For example, it is usually convenient to dissolve or disperse the desired amount of a phosphorus compound in the hydrocarbon feedstock prior to introduction thereof into the reaction zone, thereby providing premixing and dilution of the phosphorous compound in the feedstock. However, it should be noted that dilution and proportioning of a phosphorus containing substance can also be accomplished by dispersing or dissolving said substance in a carrier such as water, alcohol, nitrogen or flue gases and thereafter injecting the resulting mixture into the reaction zone.

The exact amount of phosphorus containing substance injected into the carbon forming zone can vary substantially depending upon such parameters as, the extent of property modification desired, carbon forming conditions, the amount of alkali metal additive, if any, utilized, and the like. Generally speaking, however, the supplying of between about 100 and about 50,000 parts of phosphorus to the reaction zone per million parts by weight of the carbon black produced will normally suffice to produce the desired change in rubber hardness properties. Obviously, however, larger amounts of phosphorus can be utilized if desired; provided of course, that the concentration of phosphorus residue remaining on the black product is acceptable.

The process of the present invention is compatible with many other methods of improving carbon blacks produced by the thermal decomposition or incomplete combustion of a fluid hydrocarbon. In particular, the present process is extremely advantageous when utilized in conjunction with the processes taught by the aforementioned Friauf et al. patents. When utilized thusly, carbon blacks possessing the desirable combination of rubber properties of low modulus and good elongation at yield (imparted by the alkali metal additives) and good hardness (imparted by the phosphorus containing substances of the present invention) can be produced. In fact, it is quite surprising that the beneficial effects attainable by use of alkali metal additives in the carbon forming zone are affected little or not at all by the additional use of phosphorus containing substances of the present invention.

When both an alkali metal and phosphorous are to be charged into the carbon forming zone it is usually convenient to utilize salts of phosphorus containing acids comprising each of the above-mentioned elements as the additive. For instance, salts such as the potassium phosphates ($K_3PO_4$, $KH_2PO_4$, $K_2HPO_4$ and $K_4P_2O_7$) are generally suitable phosphorus and alkali metal containing substances.

There follow a number of illustrative non-limiting examples:

Example 1

A gas furnace black is produced by charging into the bottom end of a cylindrical glass enclosed reaction zone having the dimensions of 4″ diameter and about 37″ length, about 4.25 ft.$^3$/hr. of acetylene and about 1.5 ft.$^3$/hr. of air. Methanol is injected into the carbon forming zone at a rate of about 1.5 ml./min. The resulting mixture is ignited within the glass enclosure and the black produced is continuously removed from the upper end of the enclosure by a cyclone and bag filter separation system. Under these conditions there is continuously produced for about 8 hours about 100 grams/hour of black. The collected black from this run will be hereinafter referred to as sample 1.

The run is continued under the same conditions as in the previous paragraph with the exception that methanol solutions containing various additives are injected into the carbon forming zone at a rate of about 1.5 ml./min. The resulting black product formed during each of said injections is collected. The table following the present example sets forth the samples collected and the types and concentration of the additives utilized. Cured milled natural rubber compositions containing each of the blacks produced are then formulated in accordance with the procedure set forth in ASTM D–15. The resulting compositions are then tested for modulus, elongation and hardness properties in accordance with the procedures in ASTM D–412 and ASTM D–676. The results of said testing are also shown in the following table:

TABLE.—RUBBER PROPERTIES OF BLACK

| Sample | Additive | Additive conc., g./100 ml. | 400% modulus (ASTM D-412) | Percent elongation at yield (ASTM D-412) | Hardness (ASTM D-676) |
|---|---|---|---|---|---|
| I | None | None | 1,670 | 560 | 60 |
| II | $H_3PO_4$ | .35 | 1,580 | 600 | 64 |
| III | KCl | .21 | 600 | 700 | 53 |
| IV | KCl | .21 | 640 | 705 | 63 |
|   | $H_3PO_4$ | .35 |   |   |   |

Example 2

A carbon black furnace was operating on about 60 gallons per hour of residual tar recovered from a cycle stock in a petroleum refinery cracking operation. This make liquid was preheated to 500° F. and introduced axially into the cylindrical reaction zone of the furnace of the upstream end of said furnace. The atomized make liquid was thermally decomposed with the aid of a turbulent combustion reaction maintained by six jets of natural gas equally spaced around the atomization nozzle and a stream of air entering the annular space surrounding the gas jets through a spiral scroll at the same end of the furnace.

Operating in this way in said furnace having a short cylindrical section about 18″ in diameter and 9″ long followed by a second short constricted cylindrical section about 9″ in diameter and 9″ long and using a total of about 3000 cu. ft./hr. of natural gas and 55,300 cu. ft./hr. of air, a standard high structure type furnace black was produced at a rate of about 220 lbs./hr. The control black product was then compounded in a 50 part black/SBR–1000 rubber standard recipe and cured under standard conditions. The rubber composition was then tested for 300% modulus and hardness properties.

Without any change whatsoever in furnace configuration, parts, collection system, etc., or in type of make liquid hydrocarbon, fuel, etc., and with no other change in operating conditions except the introduction into the make hydrocarbon stream after the preheater and before it entered the air atomization nozzle of 1.5 gallons per hour of dilute aqueous solution of KCl containing 0.029 lb. per gallon, the nature of the black produced was changed dramatically. When a cured SBR–1000 rubber composition is produced and tested it is found that the 300% modulus represents only about 60% and the hardness about 80% of the control black. The amount of KCl added represents about 104 parts by weight per million parts of black produced. Again, without any changes in the furnace operating conditions there is injected into the make hydrocarbon stream instead of the KCl solution 1.5 gallons per hour of an aqueous solution comprising about 6.3 lbs. monobasic potassium phosphate per gallon. Carbon black is produced at about 215 lbs./hr. Thus, the rate of addition of potassium and phosphorus represents about 12,500 parts K and about 10,000 parts P per million parts of carbon black product. When a standard SBR–1000 recipe is compounded and cured utilizing this black it is found that the modulus value is again about 60% of the control while the hardness of the composition is found to be about 95% of the control.

When the procedure is repeated with the exception that phosphoric acid is utilized instead of potassium phosphate in the water solution and is provided to the reaction zone at a concentration of about 10,000 parts P per million parts by weight of the black product the resulting black is found to impart substantially higher modulus values to rubber compositions and the hardness thereof is found to be about 104% of the control.

Obviously, many changes can be made in the above description and examples without departing from the scope of the invention. For instance, although only phosphoric acid and potassium phosphate were specifically mentioned in the examples, many other phosphorous containing substances which can be charged into a carbon forming reaction zone are also generally suitable such as phosphorus trichloride, phosphorous acid, phosphobenzene, potassium pyrophosphate and the like. In connection with this discussion it should be mentioned that many compounds of phosphorus such as the tri- or pentachlorides, phosphines, etc. can be difficult to handle due to an irritating, poisonous and/or pyrophoric nature. Therefore, use of such compounds is normally preferably avoided.

Moreover, black producing processes other than the gas furnace, or oil furnace processes specifically mentioned above can also be benefited by the practice of the present invention provided that the black is formed from fluid hydrocarbon feedstock. Thus, the present invention is also applicable to channel, thermal, or other well known carbon black processes.

What is claimed is:

1. In a process for producing carbon black which comprises decomposing a fluid hydrocarbon feedstock in a carbon forming reaction zone, the improvement which comprises charging into said zone at least about 100 parts per million by weight of the carbon black product of phosphorus, thereby controlling the rubber hardness properties of the carbon black product.

2. The process of claim 1 wherein the amount of phosphorus charged into said zone represents at least about 1000 parts per million parts by weight of the carbon black product.

3. The process of claim 1 wherein said phosphorus is represented by an inorganic or organic phosphorus compound.

4. The process of claim 1 wherein there is additionally charged into said zone at least about 1 part by weight of an alkali metal per million parts of carbon black product.

5. The process of claim 4 wherein said alkali metal is potassium.

6. The process of claim 4 wherein said alkali metal is an alkali metal salt of a phosphorus containing acid.

7. The process of claim 6 wherein said alkali metal salt is potassium phosphate.

8. The process of claim 1 wherein said carbon black producing process is a furnace process.

References Cited

UNITED STATES PATENTS

| | | | |
|---|---|---|---|
| 3,010,794 | 11/1961 | Friauf et al. | 23—209.4 |
| 3,206,285 | 9/1965 | Johnson | 23—209.4 |
| 3,244,484 | 4/1965 | Johnson | 23—209.4 |

EDWARD J. MEROS, *Primary Examiner.*

U.S. Cl. X.R.

23—209.6, 209.8; 106—307